(12) United States Patent
Abernathy et al.

(10) Patent No.: US 10,275,251 B2
(45) Date of Patent: Apr. 30, 2019

(54) PROCESSOR FOR AVOIDING REDUCED PERFORMANCE USING INSTRUCTION METADATA TO DETERMINE NOT TO MAINTAIN A MAPPING OF A LOGICAL REGISTER TO A PHYSICAL REGISTER IN A FIRST LEVEL REGISTER FILE

(71) Applicant: International Business Machines Corporation, Armonk, NY (US)

(72) Inventors: Christopher M. Abernathy, Austin, TX (US); Mary D. Brown, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 13/664,984

(22) Filed: Oct. 31, 2012

(65) Prior Publication Data

US 2014/0122841 A1    May 1, 2014

(51) Int. Cl.
*G06F 9/34* (2018.01)
*G06F 9/30* (2018.01)
*G06F 9/38* (2018.01)

(52) U.S. Cl.
CPC ........ *G06F 9/3012* (2013.01); *G06F 9/30138* (2013.01); *G06F 9/384* (2013.01); *G06F 9/3826* (2013.01)

(58) Field of Classification Search
CPC ........ G06F 9/3012; G06F 9/3016; G06F 9/34; G06F 9/3824; G06F 9/3826; G06F 9/384
See application file for complete search history.

(56) References Cited

U.S. PATENT DOCUMENTS 5,592,679 A     1/1997  Yung
5,956,747 A  *  9/1999  Wilhelm et al. .............. 711/140
(Continued)

FOREIGN PATENT DOCUMENTS

EP    0373790 A2  *  6/1990
GB    2495361  A  * 12/2013

OTHER PUBLICATIONS

Yung et al., "Caching Processor General Registers", 1995, pp. 307-312.*

(Continued)

*Primary Examiner* — David J. Huisman
(74) *Attorney, Agent, or Firm* — DeLizio Law, PLLC

(57) ABSTRACT

A processor includes a first level register file, second level register file, and register file mapper. The first and second level register files are comprised of physical registers, with the first level register file more efficiently accessed relative to the second level register file. The register file mapper is coupled with the first and second level register files. The register file mapper comprises a mapping structure and register file mapper controller. The mapping structure hosts mappings between logical registers and physical registers of the first level register file. The register file mapper controller determines whether to map a destination logical register of an instruction to a physical register in the first level register file. The register file mapper controller also determines, based on metadata associated with the instruction, whether to write data associated with the destination logical register to one of the physical registers of the second level register file.

18 Claims, 8 Drawing Sheets

(56) References Cited

U.S. PATENT DOCUMENTS

| | | |
|---|---|---|
| 6,212,544 B1 | 4/2001 | Borkenhagen et al. |
| 6,516,404 B1 | 2/2003 | Arimilli et al. |
| 6,839,831 B2 | 1/2005 | Balmer et al. |
| 6,934,830 B2 | 8/2005 | Kadambi et al. |
| 7,032,101 B2 | 4/2006 | Gschwind et al. |
| 7,185,182 B2 | 2/2007 | Col |
| 7,284,092 B2 | 10/2007 | Nunamaker et al. |
| 7,318,127 B2 | 1/2008 | Hrusecky et al. |
| 7,444,499 B2 | 10/2008 | Davis et al. |
| 7,475,224 B2 | 1/2009 | Gschwind |
| 7,596,682 B2 | 9/2009 | Shippy |
| 7,631,167 B2 | 12/2009 | Capek et al. |
| 7,711,898 B2 | 5/2010 | Sodani et al. |
| 7,725,687 B2 | 5/2010 | Menon |
| 7,769,986 B2 | 8/2010 | Abernathy et al. |
| 7,774,583 B1 | 8/2010 | Gupta et al. |
| 8,028,152 B2 | 9/2011 | Glew |
| 8,069,308 B2 | 11/2011 | Larson et al. |
| 8,200,949 B1* | 6/2012 | Tarjan et al. .................. 712/225 |
| 9,959,121 B2 | 5/2018 | Abernathy et al. |
| 2002/0124157 A1 | 9/2002 | Le et al. |
| 2004/0225838 A1* | 11/2004 | Biles .............................. 711/118 |
| 2005/0138297 A1* | 6/2005 | Sodani et al. ................. 711/143 |
| 2006/0026381 A1 | 2/2006 | Doi et al. |
| 2007/0083735 A1* | 4/2007 | Glew ............................. 712/214 |
| 2008/0133893 A1 | 6/2008 | Glew |
| 2010/0274961 A1 | 10/2010 | Golla et al. |
| 2011/0167243 A1 | 7/2011 | Yip et al. |
| 2011/0283096 A1 | 11/2011 | Abernathy et al. |
| 2011/0320771 A1 | 12/2011 | Mejdrich et al. |
| 2012/0072700 A1* | 3/2012 | Abernathy et al. ............ 712/205 |
| 2012/0079503 A1* | 3/2012 | Dally et al. ................... 718/108 |
| 2013/0086364 A1* | 4/2013 | Gschwind et al. ............ 712/220 |
| 2013/0151818 A1 | 6/2013 | Barak et al. |
| 2014/0122840 A1 | 5/2014 | Abernathy et al. |
| 2014/0122842 A1 | 5/2014 | Abernathy et al. |

OTHER PUBLICATIONS

Cruz et al., "Multiple-Banked Register File Architectures", Jun. 2000, 10 pages.*

Bray et al., "A Two-Level Windowed Register File", Dec. 1991, 23 pages.*

"U.S. Appl. No. 13/664,974 Office Action", dated Mar. 26, 2015, 12 pages.

"U.S. Appl. No. 13/664,991 Office Action", dated Apr. 9, 2015, 25 Pages.

Coffey, "Writing a hash function in Java: a practical guide to implementing hashCode()", Apr. 2, 2010, 3 Pages.

Murray, "Why is XOR the default way to combine hashes?", May 4, 2011, 4 Pages.

Vandierendonck, et al., "XOR-Based Hash Functions", Jul. 2005, 13 Pages.

"U.S. Appl. No. 13/664,974 Final Office Action", dated Sep. 1, 2015, 10 pages.

"U.S. Appl. No. 13/664,991 Final Office Action", dated Oct. 8, 2015, 24 pages.

"U.S. Appl. No. 13/664,991 Office Action", dated Mar. 13, 2017, 19 pages.

"U.S. Appl. No. 15/013,018 FAI PreInterview Comm", Feb. 24, 2017, 11 pages.

"U.S. Appl. No. 13/664,991 Final Office Action", dated Jul. 28, 2017, 20 pages.

"U.S. Appl. No. 15/013,018 Final Office Action", dated Sep. 7, 2017, 10 pages.

"U.S. Appl. No. 15/013,018 First Action Office Action", dated Jun. 15, 2017, 10 pages.

"U.S. Appl. No. 13/664,991 Office Action", dated Jul. 27, 2018, 13 pages.

* cited by examiner

PROCESSOR FOR AVOIDING REDUCED PERFORMANCE USING INSTRUCTION METADATA TO DETERMINE NOT TO MAINTAIN A MAPPING OF A LOGICAL REGISTER TO A PHYSICAL REGISTER IN A FIRST LEVEL REGISTER FILE

BACKGROUND

Embodiments of the inventive subject matter generally relate to the field of computer architecture, and, more particularly, to a multi-threaded processor having multiple levels of register files.

As processors have evolved, the number of simultaneous threads they support has increased. In order to support this increase, the number of registers in a processor has also increased. This, along with an increase in data word size (e.g., 32 bits to 64 bits) and other factors, has led to larger register sets. As register sets get larger, data access time (latency) and power consumption has also increased.

In an effort to deal with this increase in latency and power consumption, several techniques have been employed, including using mirrored sets of registers that may be accessed independently, and adopting multi-level register files. Multi-level register files provide a smaller register file with lower latency and lower power consumption for primary usage, and a larger register file with higher latency and power consumption for secondary usage.

SUMMARY

Embodiments of the inventive subject matter include a method of operating a processor for efficient use of a multi-level register file. The processor receives an indication of a completed instruction. The indication also indicates a logical register mapped to a physical register in the first level register file. The processor determines, based on metadata associated with the completed instruction, that maintaining a mapping of the logical register to the physical register in the first level register file and allowing data of the logical register to remain in the physical register in the first level register file will reduce performance of the processor. In response to this determination, the processor writes the data associated with the logical register to a physical register in a second level register file. The processor also determines whether an entry in a mapping structure indicates a mapping between the logical register and the physical register for the completed instruction. If the processor determines a mapping between the logical register and physical register exists, the processor indicates in the entry that the entry is to be the first victimized. The processor also avoids updating the mapping structure with the mapping between logical register and the physical register if one does not already exist, allowing the physical register to be available.

Embodiments of the inventive subject matter include a processor with a first level register file, a second level register file, and a register file mapper. The first and second level register files are comprised of physical registers, and the first level register file is more efficiently accessed relative to the second level register file. The register file mapper is coupled with the first and second level register files. The register file mapper comprises a mapping structure and a register file mapper controller. The mapping structure hosts mappings between logical registers and physical registers of the first level register file. The register file mapper controller determines whether to map a destination logical register of an instruction to a physical register in the first level register file. The register file mapper controller also determines whether to write data associated with the destination logical register to one of the physical registers of the second level register file. This determination is made based on metadata associated with the instruction.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
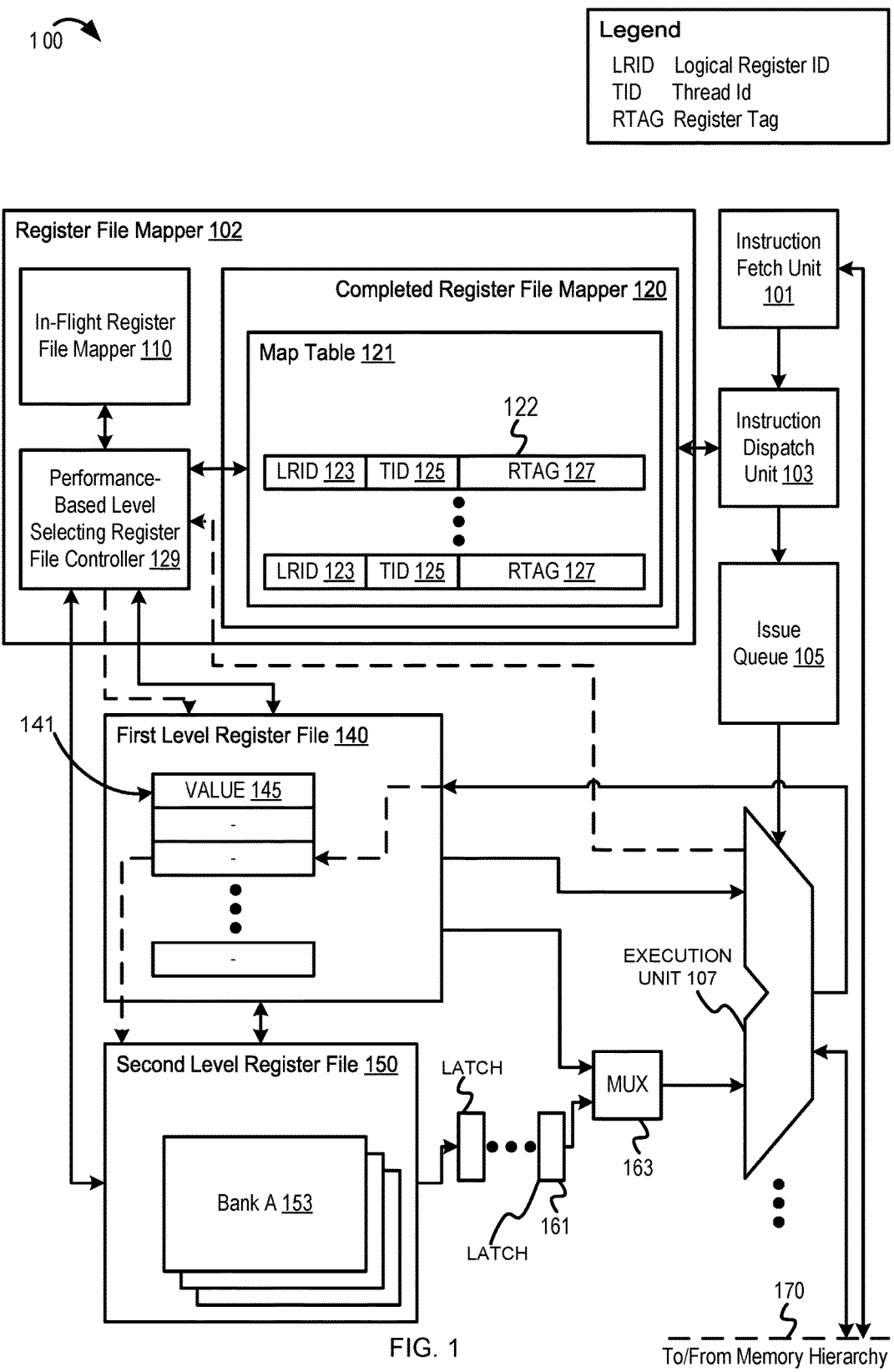
FIG. 1 depicts an example conceptual diagram of selected components of a microprocessor system comprising a multi-level register file and register file mapper with a performance-based level selecting register file controller.

The description that follows includes exemplary systems, methods, techniques, instruction sequences and computer program products that embody techniques of the present inventive subject matter. However, it is understood that the described embodiments may be practiced without these specific details. For instance, although examples refer to using a first level register file consisting of one set of registers and a second level register file consisting of multiple banks of registers, embodiments are not so limited. Many different multi-level register file configurations are possible, including a first level register file consisting of multiple banks of registers, multiple first level register files consisting of one set or multiple banks of registers, a second level register file with only one set of registers, multiple second level register files, and additional levels of register files, among many other variations. Furthermore, although embodiments may describe a set of scenarios where certain functionality may be used, the functionality is not limited to the described scenarios, nor is the functionality required to be used in the described scenarios. In other instances, well-known instruction instances, protocols, structures and techniques have not been shown in detail in order not to obfuscate the description.

A processor operates on data dictated by instructions that specify the operation (such as addition or subtraction), the locations of the operands, and the location where the result should be placed. The locations of the operands are references to registers, which are storage locations in the processor. An example of an instruction might be: ADD R1, R2, R3. This instruction tells the processor to add the values in register one (R1) and register two (R2), and place the result into register three (R3). "ADD" is the operation, "R1" and "R2" are operand locations, and "R3" is the result destination. The operation is referred to as an "opcode," while operand locations are referred to as "source registers" and the result destination as the "destination register."

An Instruction Set Architecture (ISA) defines the available instructions, number of registers, and other specifics. The ISA may limit the number of registers available to a certain number, but this limitation does not limit the hardware itself. Therefore, the ISA may define registers one through thirty-two, but the processor itself may contain sixty-four registers. The registers defined by the ISA are called "architectural registers," and the registers that the processor actually contains are called "physical registers." The "architectural" registers are logical, and will be referred to herein as "logical registers." Thus, the source registers specified in an instruction are "logical source registers" and the physical registers where the data resides are the "physical source registers." Destination registers may be "logical destination registers" and "physical destination registers." Additionally, the physical registers are organized into multiple register files.

In addition to potentially containing a larger number of physical registers than logical registers, registers may be grouped into multiple register files. One way to group these register files is into multiple levels. For instance, a first level register file (FLRF) has the smallest size, providing it with the lowest latency and thus higher performance. Subsequent levels of register files are larger in size, thus increasing latency and decreasing performance. The size of register files may be increased by including multiple banks of registers. For example, a second level register file (SLRF) may contain four banks of registers, with each bank containing the same number of registers as the FLRF.

Instructions go through several stages before getting executed. Initially, the instruction fetch unit (IFU) fetches an instruction from the instruction cache. The IFU decodes the instruction to determine the opcode and logical source registers, if any. The IFU then moves the instruction to the instruction dispatch unit (IDU). Prior to dispatching the instruction, the IDU determines if the one or more logical registers specified by the instruction has been renamed or mapped to the physical registers. Register renaming for logical and physical registers will be referred to herein as register mapping or mapping to distinguish from register renaming that liberates code from sequential processing. If a mapping for the logical register does not exist, a swap is requested and the IDU dispatches the instruction to the instruction queue (IQ). The IDU notifies the IQ that the instruction is waiting on a swap so that the IQ will not issue the instruction until the swap is complete. When a swap is requested, the processor swaps the contents of a physical register(s) in a lower level register file into a physical register(s) of an FLRF. Swapping also involves updating a mapping structure to reflect the swap of data from the lower level register file physical register(s) into the first level register file physical register(s). The IQ is then notified of the FLRF physical register(s) into which the operands were loaded. If a mapping already exists, the IDU dispatches the instruction to the IQ, allowing the instruction to proceed without stalling. The IQ sends the instruction to the execution unit when all operands are present in the FLRF. If the instruction designates a logical destination register, a physical register is allocated by creating a mapping between the logical destination register and the physical register in the FLRF. The result of the execution is stored in the mapped physical register.

For various reasons, an instruction may be in an incomplete state. These instructions are referred to as in-flight instructions. Executed instructions that are in a complete state, the result(s) of which may be used by subsequent instructions, are referred to as completed instructions. In-flight instructions may have data stored in the physical registers along with results of completed instructions.

A processor microarchitecture includes one or more components to manage the mapping of logical registers to physical registers of multiple levels of register files. This description refers to these one or more components as a register file mapper. A register file mapper can be implemented to include a register file mapper for in-flight instructions ("in-flight register file mapper") and a register file mapper for completed instructions ("completed register file mapper"). The IDU sends an instruction or fields of the instruction to the register file mapper to determine whether the logical registers referenced by the instruction, if any, are mapped to the physical registers. If the instruction indicates a logical destination register, the register file mapper allocates a physical register for the instruction and records an indication of the allocation in the in-flight register file mapper. If the instruction does not reference any logical source registers, the register file mapper signals the IDU to dispatch the instruction. If the instruction does reference logical source registers, the register file mapper determines if an entry exists for the logical source registers in the register file mapper. If an entry exists for all referenced logical source registers of an instruction, the register file mapper signals the IDU to dispatch the instruction to the issue queue. If one or more source logical registers do not have an entry in the register file mapper, the register file mapper attempts to read the referenced data for the source logical registers from the SLRF. The register file mapper then writes it to the FLRF, swapping it with other data if necessary. When data is written to the FLRF, the register file mapper inserts or updates an entry in a register mapping structure, recording indications of the source logical register, instruction thread identifier, and register tag. If the data was not in the SLRF, the register file mapper requests it from the memory hierarchy and updates the entry in the register file mapper accordingly.

Because the number of registers in a processor may be insufficient to hold all data the processor may use, space in the FLRF may be at a premium. Additionally, swapping data between the FLRF and SLRF, as well as retrieving data from the memory hierarchy requires extra time. Reducing swaps and memory accesses increases efficiency of the register file mapper and multiple register files, which increases processor performance. Managing the destination of data within the multi-level register files based on the potential impact the destination may have on future instructions assists in using the multi-level register files efficiently. When an instruction completes, the result would typically go into the FLRF, and the register file mapper would write the corresponding register mappings into the completed register file mapper. If a conflict arose in which another thread needed to access the same logical register or the space was otherwise needed, the completed register file mapper would have to decide which data to cast out to the SLRF to solve the conflict or free space. This data movement potentially puts data that will be used by a subsequent instruction in the higher latency SLRF, leading to decreased performance.

A register file mapper can be designed to write particular data to the SLRF without writing an entry into the completed register file mapper. If there is no entry in the completed register file mapper for a particular physical register, then that physical register in the FLRF is available. This allows the lower latency FLRF to be used for data that more likely impacts performance, reducing the likelihood of performance impacting cast outs of data from the FLRF to the SLRF.

FIG. 1 depicts an example conceptual diagram of selected components of a microprocessor system comprising a multi-level register file and register file mapper with a performance-based level selecting register file controller (hereinafter referred to as just "register file controller"). FIG. 1 depicts a microprocessor system 100 including an IFU 101, IDU 103, IQ 105, execution units 107, a register file mapper 102, an FLRF 140, an SLRF 150, and an optional set of latches 161 and optional multiplexer 163. The register file mapper 102 contains an in-flight register file mapper 110, a completed register file mapper 120, and a register file controller 129. The completed register file mapper 120 includes a map table 121. The map table includes entries 122. Each of the entries 122 includes a logical register identifier field 123, a thread identifier field 125, and a register tag field 127. The logical register identifier field 123 and the thread identifier field 125 host identifiers that act as indexes into the map table 121. The in-flight register file mapper 110 includes a map table similar to the map table 121. The FLRF 140 contains a plurality of physical registers 141. The physical registers 141 of the FLRF 140 are identified by the values in the register tag fields 127 of the map table 121. The SLRF 150 includes register file banks 153. Each bank can include the same number of registers as in the FLRF 140.

When the execution unit 107 completes execution of an instruction that references a logical destination register, the execution unit 107 notifies the register file controller 129. Before completion, an entry in the in-flight mapper 110 for the instruction indicates a logical destination register identifier, a register tag, and a thread identifier. The logical destination register identified by the logical destination register identifier has previously been mapped to a physical register identified by the register tag. The execution unit 107 writes the result of executing the instruction into the one of the physical registers 141 identified by the register tag. The register file controller 129 writes the register tag, the instruction thread identifier and logical destination register identifier from the in-flight mapper 110 into the map table 121. The register file controller 129 then removes the entry for the executed instruction from the in-flight register file mapper 110.

A physical register is considered allocated when an entry with that physical register's register tag exists in the in-flight register file mapper 110 or the map table 121. If all of the physical registers 141 are allocated and data not currently contained in the FLRF 140 is needed, then data is cast out from the FLRF 140 or swapped between the FLRF 140 and the SLRF 150. In order to cast out data from the FLRF 140, the register file controller 129 creates a cast out request, putting it into a queue with swaps, loads, and other operations that use the register file read and write ports. When the cast out request is ready, the register file controller 129 writes the data to the SLRF 150 and removes the mapping from map table 121. This entire process will be hereinafter referred to as "casting out" (and related variations).

In certain scenarios, the register file controller 129 can determine that the result of an instruction may be cast out from the FLRF 140 to the SLRF 150 immediately. This deallocates the mapped physical register and makes it available for data that has a greater impact on performance. These scenarios occur when the access latency for one instruction result may be increased in order to decrease the access latency for other data. The register file controller 129 can use metadata associated with an instruction to help determine whether an instruction result may be cast out immediately. The metadata may take a variety of forms, the most common being flags associated with the instruction, special opcodes, and statistics kept by the processor or the register file controller 129.

For example, the register file controller 129 can be designed to check a flag to determine if an instruction is associated with a low priority thread. If the thread has a low priority, then casting out associated data provides more space for data associated with higher priority threads. The register file controller 129 can also be designed to check a flag to determine if an instruction is associated with a microcoded routine. A microcoded routine is created when the processor breaks a complex instruction up into simpler instructions. The results from the simpler instructions are typically consumed very quickly, thus the result will likely be consumed before the cast out request gets through the register file controller 129 queue. The register file controller 129 can also be designed to check a flag to determine if an instruction is associated with a software routine that does not typically consume instruction results for a long period of time, if at all. For example, an initialization routine may load data that might be used at some unknown point in the future. This data may be cast out immediately, allowing the physical registers 141 to be used for data that may be used sooner.

Additionally, the register file controller 129 can be designed to track the frequency of logical register usage or the thrashing rate of a thread. The register file controller 129 can cast out infrequently used logical destination registers immediately because the probability the data will be accessed soon is small. When a thread is thrashing, the logical destination registers are not being accessed frequently. This causes many swaps, increasing the conflicts for the physical registers 141. When the register file controller 129 casts out the logical destination registers associated with an excessively thrashing thread, swaps are reduced, increasing performance.

To track the frequency of logical register usage, the register file controller includes a counter register for each logical register and a special register that holds a programmable threshold value. When a logical register is accessed, the associated counter register is incremented. When an instruction result is stored in a logical register, the register file controller 129 compares the value in the associated counter register with the threshold value. If the counter register value is smaller than the threshold value, the register file controller 129 determines that the logical register is infrequently used. The counter register is reset after a certain number of clock cycles.

To track the thrashing rate of a thread, the register file controller 129 includes a counter register and a programmable threshold register for each thread. When data associated with a thread was cast out or swapped, the associated counter register is incremented. When an instruction result is stored in a logical register, the register file controller 129 compares the value in the associated counter register with the threshold value. If the counter register value is larger than the threshold value, the register file controller 129 determines that the thread is excessively thrashing. The counter register would be reset after a certain number of clock cycles.

In these scenarios, when the execution unit 107 completes execution of an instruction that references a logical destination register, the execution unit 107 notifies the register file controller 129. The execution unit 107 then writes the result into the one of the physical registers 141 identified by the register tag mapped to the logical destination register identifier as specified in the in-flight register file mapper 110. If the register file controller 129 determines that the result can be cast out immediately, the register file controller 129 removes the entry from the in-flight register mapper 110. But the register file controller 129 does not insert an entry into the map table 121. Instead, the register file controller 129 casts out the result from the physical register referenced in the in-flight register file mapper 110, writing the result into the SLRF 150. Because no entry exists in the map table 121 or the in-flight register file mapper 110 for the register tag identifying the physical register, the physical register becomes available for other data immediately. This avoids occupying the physical register in the FLRF 140 with data that will not be consumed soon, and either avoids evicting data that will be consumed soon or allows the physical register to remain available for other data.

Figure 2:
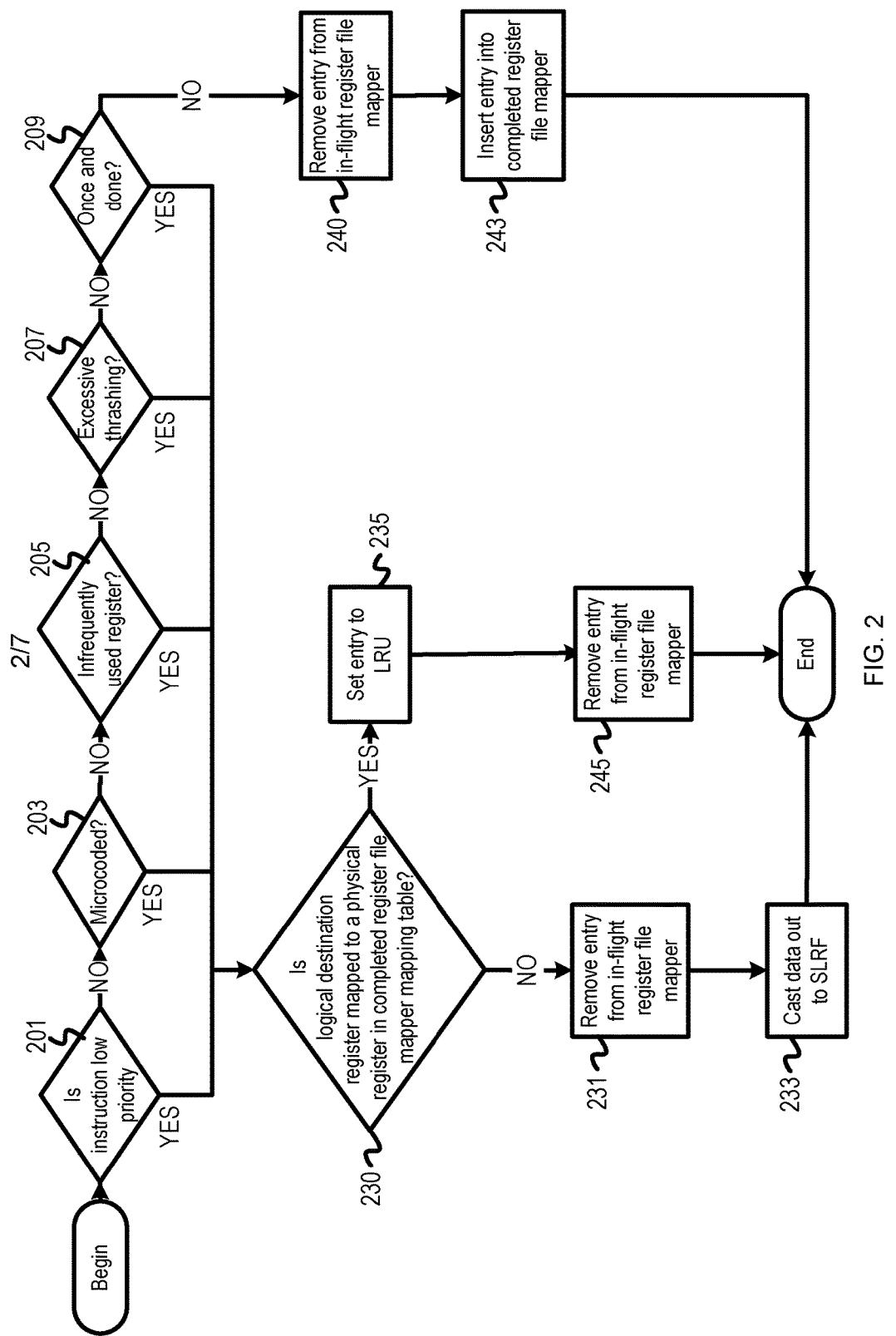
FIG. 2 depicts a flowchart of example operations for determining whether an instruction should flow into a first level register file or a lower level register file.

FIG. 2 depicts a flowchart of example operations for determining whether an instruction should flow into a first level register file or a lower level register file. As an example flowchart, FIG. 2 presents operations in an example order from which embodiments can deviate (e.g., operations can be performed in a different order than illustrated and/or in parallel).

At block 201, a register file controller determines if an instruction is associated with a low priority thread. The register file controller checks a flag associated with the thread or the instruction itself specifies priority. The ISA may include this flag, allowing it to be set explicitly by the programmer or compiler. It may also be determined dynamically by the operating system, processor, or other software or hardware mechanism. If the register file controller determines that the instruction has been given a low priority, then control flows to block 230. If the register file controller determines that the instruction has not been specified as low priority, then control flows to block 203.

At block 203, a register file controller determines if an instruction is part of a microcoded routine. A microcoded routine is one instruction that is broken up by the processor into multiple, simpler instructions. The program typically consumes the results of these instructions very soon after completion, so they can be cast out quickly while having little impact on performance. The processor generates the microcoded routine, thus allowing a flag associated with the instruction or special opcodes to signify that the instruction is part of a microcoded routine. If the register file controller determines that the instruction is part of a microcoded routine, then control flows to block 230. If the register file controller determines that the instruction is not part of a microcoded routine, then control flows to block 205.

At block 205, a register file controller determines if the logical destination address referenced by the instruction is an infrequently used logical register. Software compilers tend to use the beginning and ending register ranges more frequently than others. Thus, some logical registers are used much less frequently than others. If a logical register is used infrequently, there is a high likelihood that it will not be referenced again for some time, and the associated data may be cast out, allowing more frequently used data to be stored in the physical register. Logical register usage frequency is determined by comparison with a static list or dynamically. A static list can be created by running hardware simulations and determining which available logical registers are used infrequently. The hardware designers then put the identifiers of the logical registers into the register file controller or other accessible location, allowing the register file controller to compare the logical destination register to the list. To determine infrequently used logical registers dynamically, the register file controller may have a rate counter that increments on each read, write, or swap of the logical register. The rate counter would reset after a certain number of clock cycles. If the rate counter was under a programmable threshold for the referenced logical destination register, the logical register is infrequently used. If the register file controller determines that the instruction references an infrequently used logical register, then control flows to block 230. If the register file controller determines that the instruction does not reference an infrequently used logical register, then control flows to block 207.

At block 207, a register file controller determines if the thread associated with the instruction is being frequently cast out of the register file mapper. This is referred to as "thrashing." If a thread is thrashing, it is not referencing the logical registers it is using frequently, potentially forcing data for other threads to be cast out unnecessarily. If the register file controller detects that a thread is thrashing, it may cast out any instruction results of the thrashing thread from the register file mapper to the SLRF incident to determining that the thread is thrashing. This prevents conflicts with other threads, resulting in fewer swaps. To determine if a thread is thrashing, the register file controller may keep a rate counter per thread that is incremented each time a particular thread has a logical register cast out. The rate counter would reset after a certain number of clock cycles. If the rate counter reached a programmable threshold, the register file controller would determine that the thread was excessively thrashing. If determined to be excessively thrashing, the register file controller would immediately cast out the results from completed instructions associated with that thread. Control would then flow to block 230. If the register file controller determined the thread was not thrashing, control would flow to block 209.

At block 209, a register file controller determines if the software routine running is merely initialized or cleaned up at completion. Certain software routines, such as interrupt handlers, run once and do not access the results after instructions are completed. In these instances, the register file controller may cast the results out since they are unlikely to be referenced again soon. These software routines may communicate this status to the processor by utilizing a software-accessible register coupled to the register file controller. The software-accessible register could be a register included in the processor separate from the FLRF, or could be a register in the FLRF reserved for this purpose. The software routine would set a specified bit in the register to notify the processor or register file controller that the data may be cast out immediately. If the register file controller determined the results may be cast out immediately, control would then flow to block 230. If the register file controller determined the results may not be cast out immediately, then control would flow to block 240.

At block 230, the register file controller determines if the logical destination register identifier of the instruction has been mapped to a physical register. If the logical destination register has been mapped to a physical register, then control flows to block 235. If the logical destination register has not been mapped to a physical register, then control flows to block 231.

At block 231, the register file controller removes the logical destination register identifier from the in-flight register file mapper. No mapping is created in the completed register file mapper for the logical destination register identifier. Control then flows to block 233.

At block 233, the register file controller casts the result in the mapped physical register out, writing it to the SLRF. Because a mapping for the logical destination register existed only in the in-flight register file mapper, no mapping in the completed register file map table is removed.

If the logical destination register was already mapped to a physical register, then control flowed from block 230 to block 235. At block 235, the register file controller sets the logical destination register mapping to "least recently used." Each mapping has a value associated with it indicating how much time has passed since the mapping was used. This value is referred to as the "age" of the mapping and may be stored in a special set of registers or with the mapping itself. When using a "least recently used" algorithm, the oldest mapping is the first to be cast out or swapped. To set a particular mapping to "least recently used," the age of the mapping is set to be the oldest. Setting the mapping to "least recently used" allows the result to remain in the FLRF, but set to be the next swap or cast out victim. Flow then proceeds to block 245, where the register file controller removes the logical destination register identifier from the in-flight register file mapper.

If none of the criteria for selecting the SLRF instead of the FLRF apply, then control flowed to block 240 from block 209. At block 240, the register file controller removes the logical destination register identifier from the in-flight register file mapper. Control then flows to block 243.

At block 243, the register file controller writes the logical destination register identifier, associated thread identifier, and register tag into the completed register file mapper map table.

In some scenarios, the register file controller does not have a result that satisfies a criterion for being written to the SLRF instead of the FLRF. Data likely to be consumed soon may occupy all of the physical registers in the FLRF. Thus, casting out data in any one of the physical registers of the FLRF will impact performance. For example, swaps may only be available at instruction dispatch. Therefore, any data referenced by an instruction in the IQ cannot be cast out without another mechanism to allow access to the data. If the ability of the register file controller to cast out data is limited, the ability of the register file controller to optimize the use of the FLRF is also limited. To allow the register file controller to cast out data referenced by instructions in the IQ, a register file mapper can be designed to include a "register file bypass." The register file bypass allows an execution unit to bypass a higher level register file and read directly from a lower level register file. In addition, the direct access provided by the register file bypass ameliorates the performance effect of casting out of data on which a subsequent instruction depends. The register file mapper can then cast out data from the higher level register file, even if an instruction in the IQ references that data.

When the register file mapper casts out data, the register file mapper notifies the IQ of the associated register tag. The IQ then scans the instructions in the queue, setting a flag for any that reference the register tag. The IQ can then speculatively issue an instruction with the flag set while sending the register file bypass controller a register file bypass request. If the register file bypass is permitted, the register file bypass controller loads the requested data into a register file bypass storage location, which may be a special register or latch. Once loaded into a register file bypass storage location, the data is available for the execution unit. If the register file bypass request is denied, the execution unit rejects the instruction, which may be reissued again at a later point.

Figure 3:
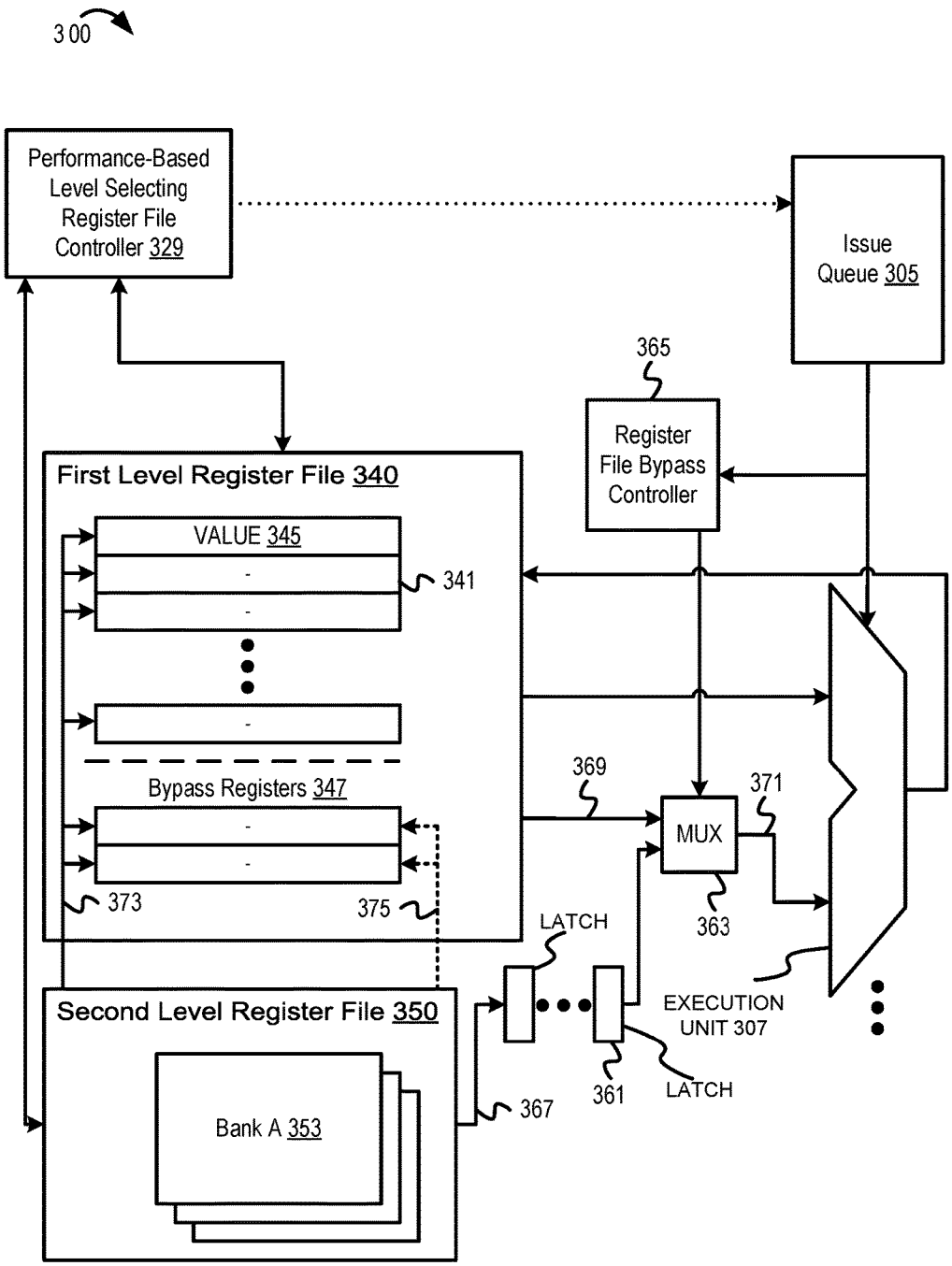
FIG. 3 depicts an example diagram of selected components of the microprocessor system comprising a multi-level register file, register file mapper, and register file bypass.

FIG. 3 depicts an example diagram of selected components of the microprocessor system comprising a multi-level register file, register file mapper, and register file bypass. FIG. 3 depicts a subset of a microprocessor system 300, including an IQ 305, execution units 307, a register file controller 329, an FLRF 340, an SLRF 350, a register file bypass controller 365, and a set of latches 361 and a multiplexer 363. The FLRF 340 contains a plurality of physical registers 341 identified by register tags. The FLRF 340 may also include an optional set of physical bypass registers 347. The SLRF 350 includes register file banks 353. A thread identifier and logical register identifier associated with the data in each latch 361 is tracked by the register file bypass controller 365. Each physical register in the set of physical bypass registers 347 also has a thread identifier and logical register identifier associated with it. These identifiers can be located in the register file bypass controller 365 or other component accessible to the register file bypass controller 365.

Instructions in the IQ 305 include register tags and a "needs_rtag" flag for each logical source register. If not all logical source registers are available at dispatch, a swap request is created by the IDU. The instruction may then be dispatched to the IQ 305 with the "needs_rtag" flag set for the logical source registers for which the swap request was created. This flag alerts the IQ 305 that the associated data is missing, keeping it from issuing the instruction until the data is available in the FLRF 340.

When all available physical registers 341 are occupied by data, the register file controller 329 may determine that data in one of the physical registers 341 should be cast out to the SLRF 350. After making this determination, the register file controller 329 notifies the IQ 305 of the register tag for the physical register containing the data to be cast out. The IQ 305 sets the "needs_rtag" flag for any instruction that refers to the register tag and is associated with the same thread. The IQ 305 may then speculatively issue any instruction that is not waiting on a swap, provided sources with the "needs_rtag" flag off are available.

In some embodiments, the microprocessor system 300 has latches 361 with an output port 367 connecting the SLRF 350 with the latches 361. Microprocessor system 300 also has a multiplexer 363 with inputs 369 from the FLRF 340, inputs from latches 361, and an output 371 connected to execution units 307. The thread identifier and logical register identifier associated with the data in each latch 361 is tracked by the register file bypass controller 365. If the IQ 305 speculatively issues an instruction with a "needs_rtag" flag on, the register file bypass controller 365 compares the instruction thread identifier and unmapped logical register identifier with the thread and logical register identifiers associated with the latches 361. If the needed data is present in one of the latches 361, the register file bypass controller 365 sets the multiplexer 371 to select the input from the appropriate one of latches 361. The value in the selected latch is provided to one of the execution unit inputs. If the data does not exist in the latches 361, the register file bypass controller 365 initiates a register file bypass request, discussed below.

In some embodiments, microprocessor system 300 has physical registers in the FLRF 340 designated as bypass registers 347. In one variation of this embodiment, the bypass registers 347 share an SLRF read port 373 with the physical registers 347. Although the bypass registers 347 are part of the FLRF 340, the bypass registers 347 are not available to the register file mapper, unlike the physical registers 341. The register file bypass controller 365 tracks the data present in the bypass registers 347 using the associated thread identifier and logical register identifier. The register file bypass controller 365 may also use other identifying information, or may update the source register tag to be one of the bypass register tags. If the IQ 305 speculatively issues an instruction with a "needs_rtag" flag on, the register file bypass controller 365 determines if the data needed is in one of the bypass registers 347. If so, the register file bypass controller 365 sets multiplexer 371 to provide one of the execution units 307 the data from the appropriate bypass register. If the data does not exist in the bypass registers 347, the register file bypass controller 365 initiates a register file bypass request, which is discussed below.

The register file bypass controller 365 arbitrates between multiple bypass requests, deciding which to accept. There is limited bandwidth between the SLRF 350 and the execution units 307, thus the register file bypass can handle only a finite number of register file bypass requests. In the embodiments utilizing bypass registers 347, the bypass registers 347 share an SLRF read port 373 with the physical registers 341. This read port is used by swaps in addition to register file bypasses, thus the register file bypass controller 365 may deny register file bypass requests to allow swaps to complete. Additionally, it is possible that the cast out request has not completed yet, so the data is not in the SLRF 350. In this case, the register file bypass request is denied since the data cannot be loaded.

If a register file bypass request is accepted, the register file bypass controller 365 moves the requested data into the particular storage mechanism used, whether a latch or bypass register. The register file bypass controller 365 may determine the location to use based on various algorithms. One embodiment utilizes a "least recently used" algorithm, in which the register file bypass controller 365 uses the least recently accessed location. In another embodiment, the register file bypass controller 365 tracks which locations have been read from since data was last loaded into them, and replaces locations that have been read at least once. After determining the location, the register file bypass controller 365 writes the data into the chosen location. Once the data is written, the register file bypass controller 365 sets the multiplexer 363 to select the input coupled to the correct location. The execution unit then receives the data from the correct location, and executes the instruction.

Figure 4:
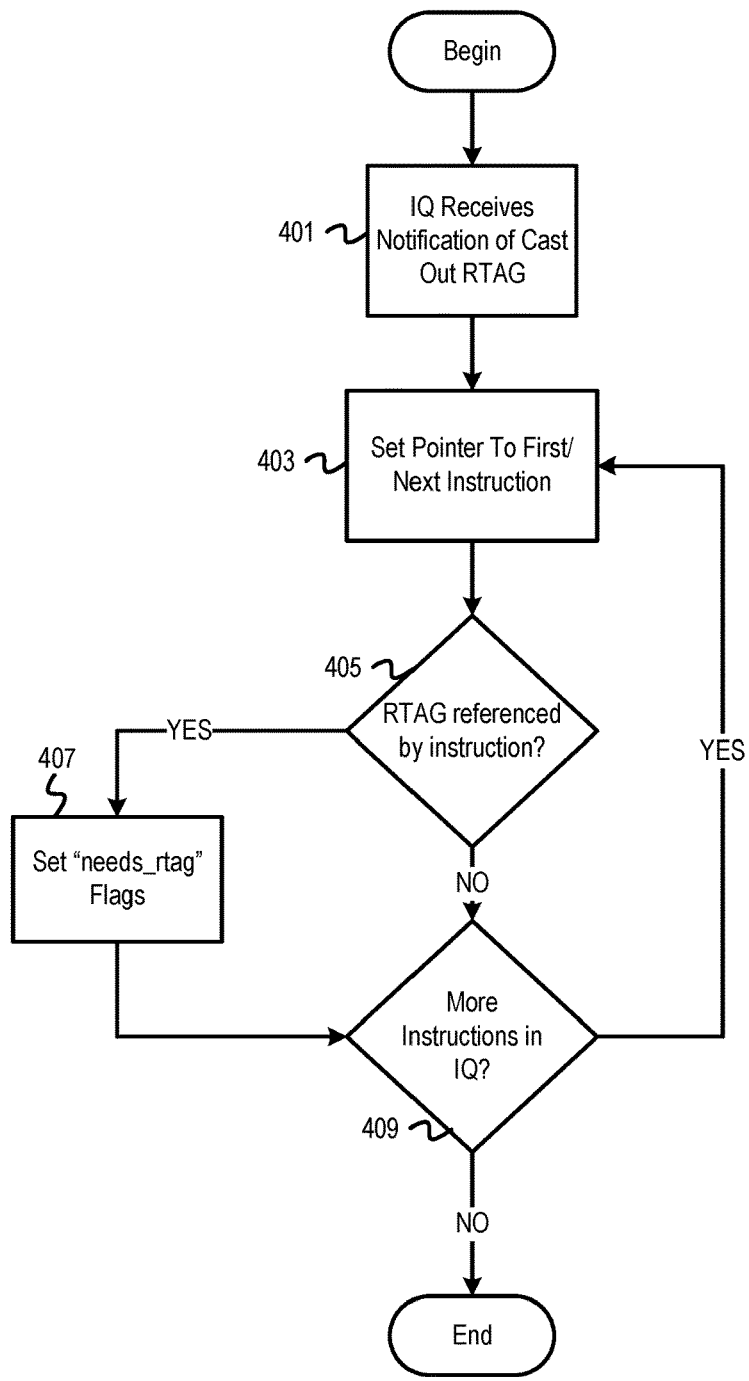
FIG. 4 depicts a flowchart of example operations for determining if instructions in the IQ reference a cast out register tag.

FIG. 4 depicts a flowchart of example operations for determining if instructions in the IQ reference a cast out register tag. FIG. 4 presents operations in an example order from which embodiments can deviate (e.g., operations can be performed in a different order than illustrated and/or in parallel).

At block 401, an IQ receives notification from a register file controller that data was cast out from a physical register in the FLRF. The register file controller sends the register tag identifying the physical register as the notification. Control then flows to block 403.

At block 403, the IQ begins a loop during which it determines which, if any, instructions in the IQ reference the register tag identifying the physical register from which data was cast out. The IQ initializes the loop by setting a pointer to the first instruction. On subsequent loops, the IQ sets the pointer to the next instruction. The instruction the pointer references is referred to as the "current instruction." Control then flows to block 405.

At block 405, the IQ determines if the current instruction references the register tag associated with the cast out data. This is accomplished by comparing the register tag to any register tags associated with the current instruction operands (instruction register tags). If one or more instruction register tags match, control then flows to block 407. If no instruction register tags match, control then flows to block 409.

At block 407, the IQ sets the "needs_rtag" flag for any instruction register tag found by the IQ at block 405. The "needs_rtag" flag may be a single bit associated with the instruction or a special value that is substituted in place of a valid register tag. The "needs_rtag" flag indicates that the instruction consumes the data that has been cast out of the physical register identified by the register tag or RTAG. Control then flows to block 409.

At block 409, the IQ determines if all instructions in the IQ have been checked at block 405. If unchecked instructions exist in the IQ, control then loops back to block 403. If no unchecked instructions exist, the loop and process end.

As noted above the "needs_rtag" flag indicates that an instruction consumes data that was cast out from the FLRF. Before an instruction issues from the IQ, the IQ determines whether the instruction consumes data cast out from the FLRF based on the "needs_rtag" flag. It will be appreciated that the name of the flag and technique for implementing the flag can vary. If the flag has been set for the instruction, then the IQ sends a register bypass request to a register file bypass controller. In some embodiments, the IQ comprises one or more components to implement functionality of a register bypass controller. In such cases, a request is not necessarily sent. The IQ can send the instruction to other internal components to perform the operations for register bypass responsive to determining that the flag has been set for the instruction.

Figure 5:
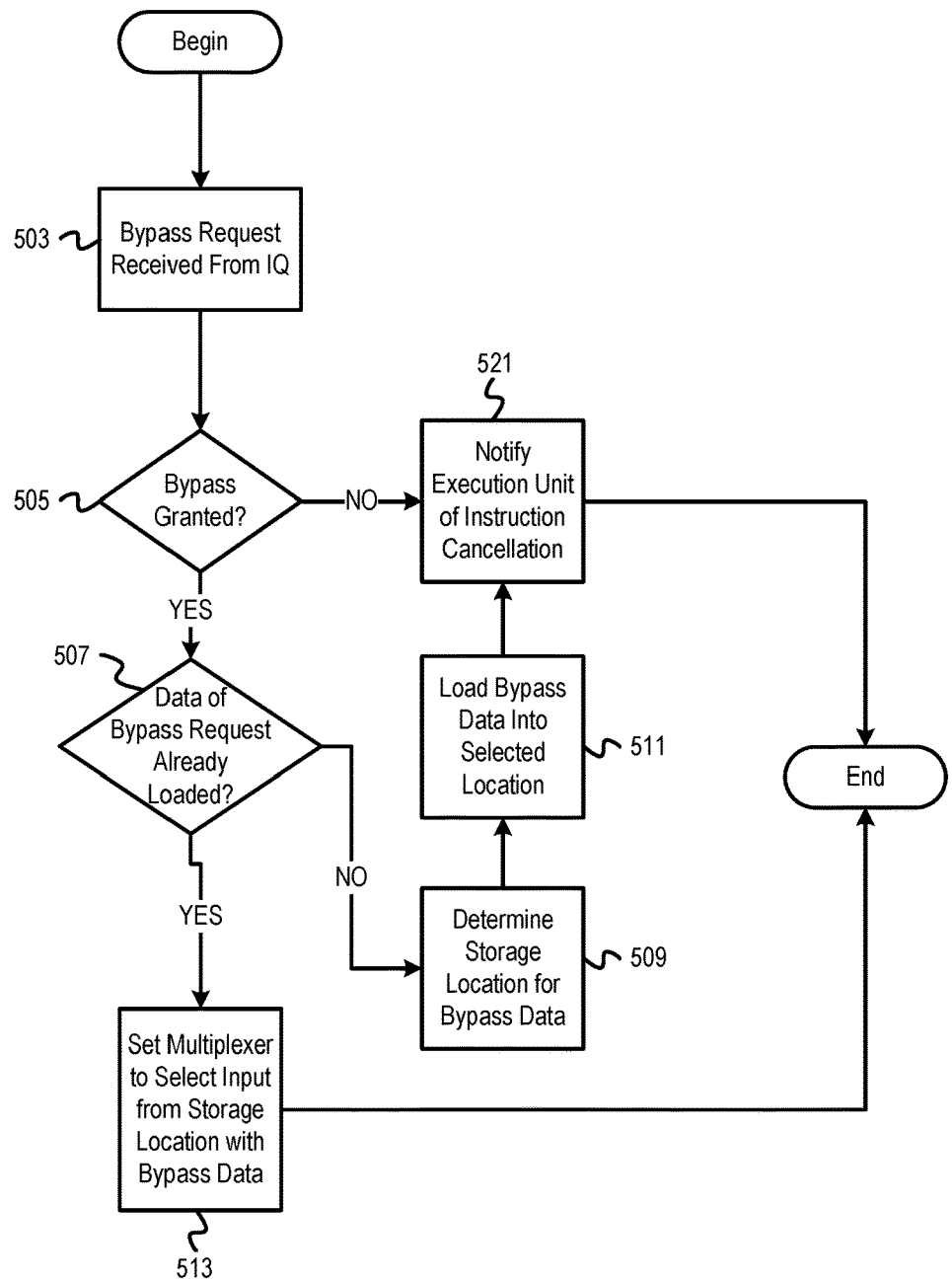
FIG. 5 depicts a flowchart of example operations for utilizing a register file bypass.

FIG. 5 depicts a flowchart of example operations for utilizing a register file bypass. FIG. 5 presents operations in an example order from which embodiments can deviate (e.g., operations can be performed in a different order than illustrated and/or in parallel).

At block 503, a register file bypass controller receives a register file bypass request from an IQ. The register file bypass request includes an instruction identifier, the thread identifier associated with the instruction and the logical register identifiers of any operands that are register-bypass eligible. An operand is register-bypass eligible if a swap request is not pending for that particular operand and the operand data is not in the FLRF. Control then flows to block 505.

At block 505, the register file bypass controller determines if the register file bypass request should be granted or denied. The granting or denying of a request is based on multiple factors, many of which are dependent on the hardware architecture design. For example, some embodiments may use dedicated bypass registers in the FLRF. These bypass registers may share SLRF read ports with the other physical registers in the FLRF. The sharing of SLRF read ports means that register file bypass requests and swap requests from the register file mapper compete for use of the ports. In these embodiments, the register file bypass controller may limit the number of bypass requests in order to allow swap requests to use the SLRF read ports, thus allowing swap requests to complete. In embodiments where the bypass registers have a dedicated SLRF read port, the register file bypass controller can grant more register file bypass requests because there will be no conflicts with swap requests. Additionally, the number of register file bypass requests granted will depend on the number of storage locations available for register file bypass requests. If a smaller number of storage locations exist, then fewer register file bypass requests can be granted than if a large number of storage locations exist. If the register file bypass controller determines the register file bypass request should be granted, control then flows to block 507. If the register file bypass controller determines the register file bypass request should be denied, control then flows to block 521.

At block 507, the register file bypass controller determines if the data for which the register file bypass request was granted already exists in one of the register file bypass storage locations. The register file bypass controller tracks the thread identifier and logical register identifiers associated with the data in the register file bypass storage locations. The register file bypass controller compares the thread identifier and logical register identifier sent with the register file bypass request to the thread and logical register identifiers associated with the data in the register file bypass storage locations. If the data for which the register file bypass request was granted already does not exist in one of the register file bypass storage locations, control then flows to block 509. If the data for which the register file bypass request was granted already exists in one of the register file bypass storage locations, then control then flows to block 513.

At block 509, the register file bypass controller determines which register file bypass location to write the data into. The location can be determined by a variety of different algorithms. For example, the register file bypass controller can track the number of cycles since each location was accessed, referred to as the "age." The register file bypass controller can then be selected based on a "least recently used" algorithm. The data would then be loaded into the storage location that is the oldest. The register file bypass controller can also track which storage locations have been accessed since data was last loaded into the storage locations. The register file bypass controller can then assign storage locations based on which data has already been read by the instruction associated with that data. Control then flows to block 511.

At block 511, the register file bypass controller writes the data from the SLRF into the bypass storage location selected at block 509. Control then flows to block 521.

If the register file bypass controller determines that the requested data was already loaded into a register file bypass storage location at block 507, then control flowed to block 513. At block 513, the register file controller sets the multiplexer to select the input coupled with the correct register file bypass storage location. If control flowed from block 511, the input selected is the register file bypass storage location determined by the register file bypass controller at block 509. If control flowed from block 507, the input selected is the register file bypass storage location found by the register file bypass controller to contain the data at block 507.

If a register file bypass request was denied by the register file bypass controller at block 505 or after data was loaded into a bypass register at block 511, control flowed to block 521. At block 521, the register file bypass controller notifies the appropriate execution unit to cancel execution of the instruction for which the register file bypass was requested. In addition, the IQ or components of the IQ are notified that execution of the instruction has been cancelled. Execution of the instructions is cancelled because the length of time it takes to load data into a bypass storage location is longer than the length of time it takes for the instruction to reach the execution unit. Cancellation of the instruction allows the instruction to be reissued at a later time after the data is loaded into a bypass register location.

Efficient usage of a register file mapper is not limited to efficient usage of the FLRF alone. Inefficient usage of the mapping structure can lead to inefficient usage of the FLRF. Thus, efficient usage of the mapping structure itself can lead to better performance as well. For example, the register file mapper mapping structure can be implemented such that each entry in the structure is indexed by the logical register identifier. Each entry can then have space for multiple thread identifier register tag mappings. The size of each entry is determined by the underlying hardware architecture, based on multiple factors. These factors include the amount of space available on the processor and power consumption goals. The size of each entry determines the number of threads that can have mappings for a particular logical register at one time.

Due to the large number of threads handled by a processor at once, entries may not be able to hold mappings for all threads. For example, assume entries in the map table are constrained to holding mappings for three threads. If three threads already have mappings from logical register R0 to three separate physical registers, an attempt by a fourth thread to use R0 would force one of the three existing mappings to be overwritten. When a mapping is overwritten, the associated data is cast out to the SLRF. Table 1 illustrates the map table for this scenario prior to the fourth thread using R0.

TABLE 1

| | Index | | | | | |
|---|---|---|---|---|---|---|
| | Mapping #1 | | Mapping #2 | | Mapping #3 | |
| LRID | TID | RTAG | TID | RTAG | TID | RTAG |
| 0 | 1 | 01100 | 2 | 10011 | 3 | 11011 |
| 1 | — | — | — | — | — | — |
| 2 | — | — | — | — | — | — |

This is further impacted by register usage patterns. Most applications are written in a high level programming language, such as C++. A compiler transforms ("compiles") the high level programming language into the lower level instructions and machine code used by a processor. During this process, the compiler assigns logical registers to store values. The compiler frequently assigns logical registers in ascending or descending numerical order. For example, if there are thirty-two registers, a compiler may assign R1 first, then R2, R3, etc., or begin with R32, then R31, R30, and so on. Compilers also reuse previous registers when possible. Because of these two factors, the beginning registers (R1, R2 . . . ) or the ending registers (R32, R31 . . . ) tend to be used more often depending upon the assignment paradigm. In a processor that is executing multiple threads, this may lead to a higher demand for certain registers, and a lower demand for others. When combined with the mapping structure space constraints, this leads to increased conflicts for certain entries in the mapping structure, while some entries are rarely used.

Figure 8:
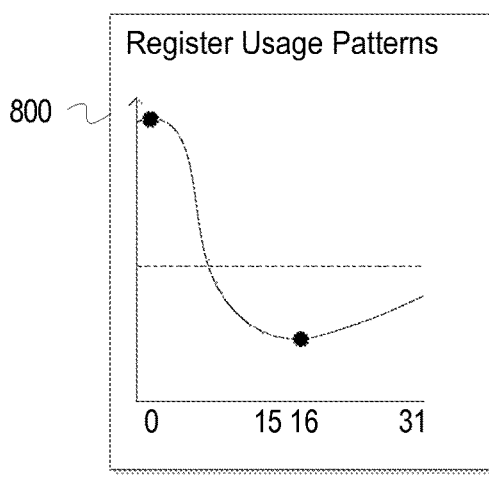
FIG. 8 depicts an example register usage pattern graph.

FIG. 8 depicts an example register usage pattern graph (hereinafter "graph"). The x-axis of the graph 800 represents the logical register identifiers and the y-axis of the graph 800 represents the number of times a logical register identifier is referenced. The solid line of the graph 800 depicts actual register usage and the dotted line of the graph 800 represents optimal register usage.

A register file mapper can be designed to create a mapping between logical registers and physical registers by hashing the thread identifier with the logical register identifier. Consider the hypothetical above where map table entries are constrained to three different thread mappings per logical register identifier. A register file mapper that combines the thread identifier with the logical register identifier could produce the result illustrated in Table 2. The map table is indexed by the combination of the thread identifier and logical register identifier, defined as H(LRID, TID). Instead of all three mappings existing in the first row, one mapping would be in each row. Thus, when a fourth thread references R0, no existing mapping is overwritten, regardless of which row the entry is mapped to. In graph 800, this is equivalent to translating some references from logical register zero to logical register sixteen, as identified by the solid black dots.

TABLE 2

| | Index | | | | | |
|---|---|---|---|---|---|---|
| | Mapping #1 | | Mapping #2 | | Mapping #3 | |
| H(LRID, TID) | TID | RTAG | TID | RTAG | TID | RTAG |
| 0 | 1 | 01100 | — | — | — | — |
| 1 | 2 | 10011 | — | — | — | — |
| 2 | 3 | 11011 | — | — | — | — |

Figure 6:
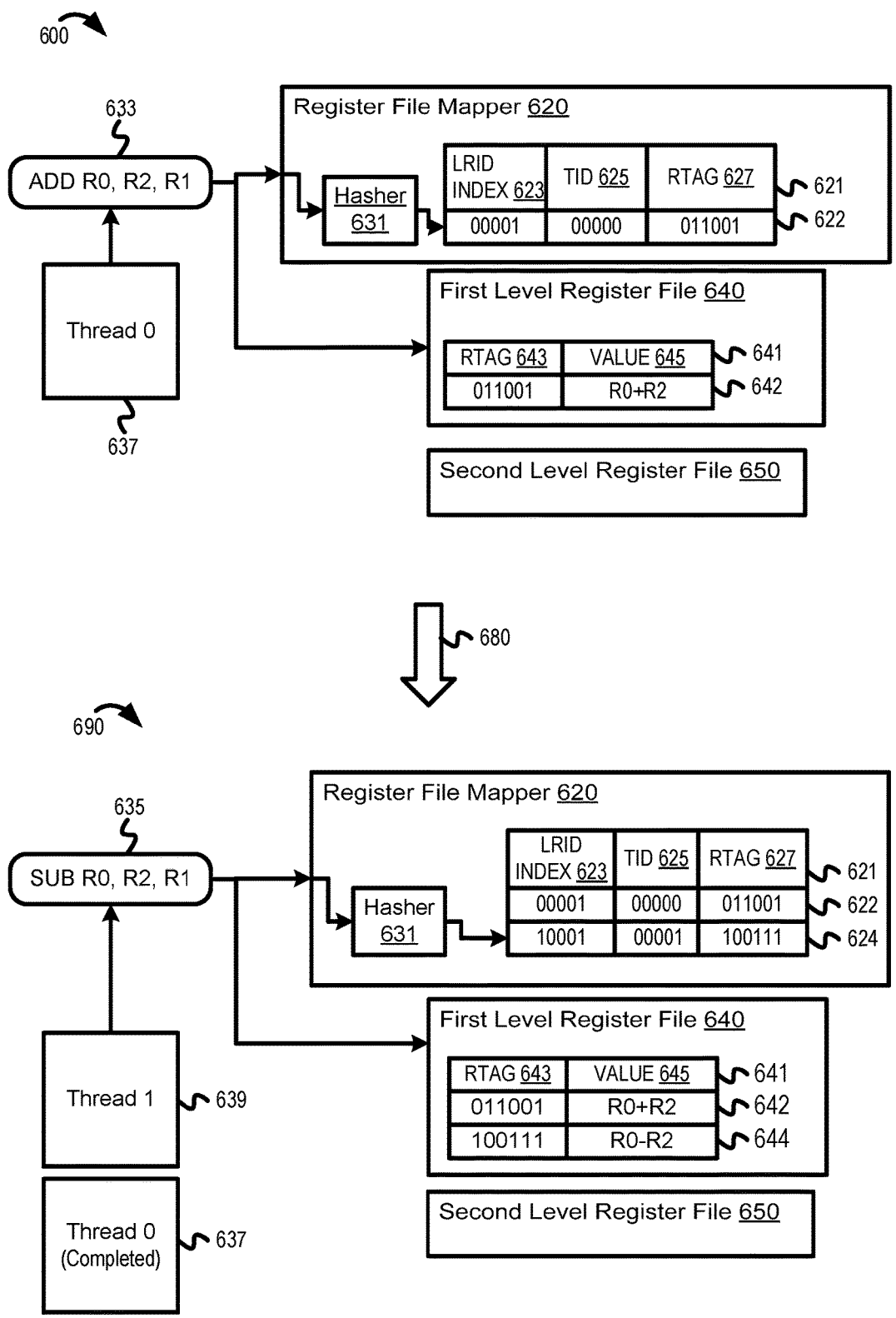
FIG. 6 depicts the states of an example register file mapper implemented using a hasher after a sequence of instructions.

FIG. 6 depicts the states of an example register file mapper implemented using a hasher after a sequence of instructions. FIG. 6 depicts the state 600 after a first example instruction 633 and the state 690 after a second example instruction 635. The first example instruction 633 is associated with thread 0 637 and the second example instruction is associated with thread 1 639. Both states include a register file mapper 620, an FLRF 640, and an SLRF 650. The register file mapper 620 includes a map table 621 and a hasher 631. The map table 621 is indexed by logical register identifier index 623, and contains thread identifiers 625 and register tags 627. The FLRF 640 contains physical registers 641, identified by register tags. Arrow 680 represents the passage of time. In this example embodiment, thread identifiers and logical register identifiers are represented in binary using five bits and register tags are six bits. Each entry in the map table 621 is limited to a mapping for one thread at a time.

State 600 depicts the state of the system after the first instruction 633 has dispatched, issued, and completed execution. The first instruction 633 instructs the execution unit to add the values contained in logical register zero and logical register two and place the result into logical register one. The register file mapper 620 receives notification that the instruction 633 completed execution, including the logical destination register identifier and thread identifiers. The register file mapper 620 generates a hash of the logical destination register identifier and instruction thread identifier using the hasher 631. The register file mapper 620 uses the hash value as the logical register identifier index 623 into the map table 621 and provides the mapped register tag to the execution unit. The execution unit writes the result of the instruction into the physical register identified by the mapped register tag 627. In some embodiments, the hasher 631 reverses the bit representation of the thread identifier and does a bitwise exclusive-or operation using the reversed thread identifier and logical destination identifier. The result of the bitwise exclusive-or operation applied to the reversed thread identifier (00000) and logical destination register identifier (00001) is a hash value of 00001. The register file mapper 620 selects the row 622 indexed by the hashed value 00001 from the map table 621. The register file mapper 620 provides the register tag 011001 to the execution unit. The execution unit writes the result of the operation (R0+R2) into the physical register 641 identified by register tag 011001. This results in a single value stored in the FLRF 640, indicated by label 642.

State 690 depicts the state of the system after instruction 635 has dispatched, issued, and completed execution. The second instruction 635 instructs the execution unit to subtract the value in logical register two from the value in logical register zero and place the result into logical register one. The register file mapper 620 receives notification that the instruction 635 completed execution, including the logical destination register identifier and thread identifiers. The register file mapper 620 generates a hash of the logical destination register identifier and instruction thread identifier using the hasher 631. The register file mapper 620 uses the hash value as the logical register identifier index 623 into the map table 621 and provides the mapped register tag to the execution unit. The execution unit writes the result of the instruction into the physical register identified by the mapped register tag 627. The hasher 631 reverses the bit representation of the thread identifier and does a bitwise exclusive-or operation using the reversed thread identifier and logical destination identifier. The result of the bitwise exclusive-or operation applied to the reversed thread identifier (10000) and logical destination register identifier (00001) is a hash value of 10001. The register file mapper 620 selects the row 624 indexed by the hash value 10001 from the map table. The register file mapper 620 provides the register tag 100111 to the execution unit. The execution unit writes the result of the operation (R0–R2) into the physical register 641 identified by register tag 100111. This results in a second value being stored in the FLRF 640, indicated by label 644.

Without the hasher 631, the register file mapper 620 would have mapped the logical destination register used by the second instruction to the same entry as the logical destination register referenced by the first instruction. Due to the limitation of only one mapping per entry, the register file mapper 620 would have replaced the existing mapping. This replacement would have resulted in the register file mapper 620 casting out the first value 642 to the SLRF 650. If the value 642 is located in the SLRF 650 and is referenced by a subsequent instruction, it may need to be swapped into the FLRF 640. Even if the embodiment utilizes a register file bypass system as described above, the increased latency results in lower performance, and may increase contention for the register file bypass data pathways.

Although not discussed above or depicted in the figures, there are many alternative embodiments possible. The following alternatives and variations do not constitute an exclusive list, and a specific embodiment may use any combination of the various embodiments discussed. Regarding flowcharts, not all operations illustrated and discussed are required. Additionally, other operations may be added to the processes depicted.

In reference to FIG. 1, the components may be arranged in a variety of configurations. For example, the IDU 103 can be embodied as part of the IFU 101. All components contained in the register file mapper 102 can be embodied as individual components or combined in various combinations. The register files can be embodied with multiple FLRFs 140 and multiple SLRFs 150. Additional levels of register files can be added, and the FLRF 140 can contain multiple individual register files. Instruction metadata can take a variety of forms as well. The instruction may have bits reserved as flags, or registers may be designated to hold values that act as flags or otherwise provide information about the instruction. Special opcodes may be used either by a programmer or the processor. An example of the latter is the processor breaking down an instruction into a microcoded routine, which can be a set of instructions using opcodes specific to microcoded routines. The processor or register file controller 129 can generate and store metadata and statistics about instructions, threads or the state of the processor or register file controller 129. This can be accomplished by using a variety of methods, including counter registers and rate counter registers. Statistics and similar metadata may be passed to the processor and register file controller 129 in a manner similar to using a flag. Because threads and instructions are intrinsically linked, metadata about a thread can be considered metadata about the associated instructions.

Additionally, functionality of the components may be combined or vary from the described functionality. For example, the functions of the in-flight register mapper 110 and the completed register file mapper 102 can be combined into one mapper serving both purposes. Execution units 107 could write directly to the SLRF 150 or another register file instead of writing to the FLRF 140 and having the register file controller 129 cast the data out. Additionally, when the register file controller 129 casts data out, the physical register in the FLRF 140 that held the data can be zeroed out or left untouched until overwritten.

In reference to FIG. 3, the components may be arranged in a variety of configurations. For example, the latches 361 may be connected in a series, in parallel, or a combination of both. Each of the execution units 306 may have an individual set of latches 307, or a single set of latches 307 may be shared between multiple execution units 306. Additionally, the number of latches 361 can vary between embodiments. The embodiments are not limited to using only latches 361 or only bypass registers 347, but can use a combination of both. In an embodiment using bypass registers 347, the bypass registers 347 may have a separate SLRF read port 375. This adds complexity to the design, but prevents register file bypass requests from conflicting with reads from the SLRF 350.

Additionally, functionality of the components may be combined or vary from the described functionality. For example, a component other than the register file bypass controller 365 may track the information identifying what data is in which register file bypass storage location. Additionally, the register file bypass controller 347 arbitration logic may vary based on the design of the hardware. For example, when the bypass registers 347 share an SLRF read port 373 with the other physical registers 341, limits may be placed on the number of times a thread may be granted a bypass request within a given period. In an embodiment that does not share the SLRF read port 373 with the other physical registers 341, this limit may be removed. Additionally, an alternative embodiment may add the ability to request a swap for an instruction in the IQ 305.

In reference to FIG. 6, the use of a hasher 631 may be extended to additional register files, such as the SLRF 650, to spread register usage across banks of registers. Register bank usage patterns may resemble register use patterns, as illustrated in FIG. 8. Thus, a hash may be created using an instruction thread identifier or other information and used to specify which register bank to write out to. The hasher 631 can be embodied to operate on bits in parallel or serially.

Additionally, the specific order of operations may differ in an actual implementation, and more may be included. For example, the register tag identifying the destination register for an instruction may be provided to the execution unit with the instruction, instead of after completion.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
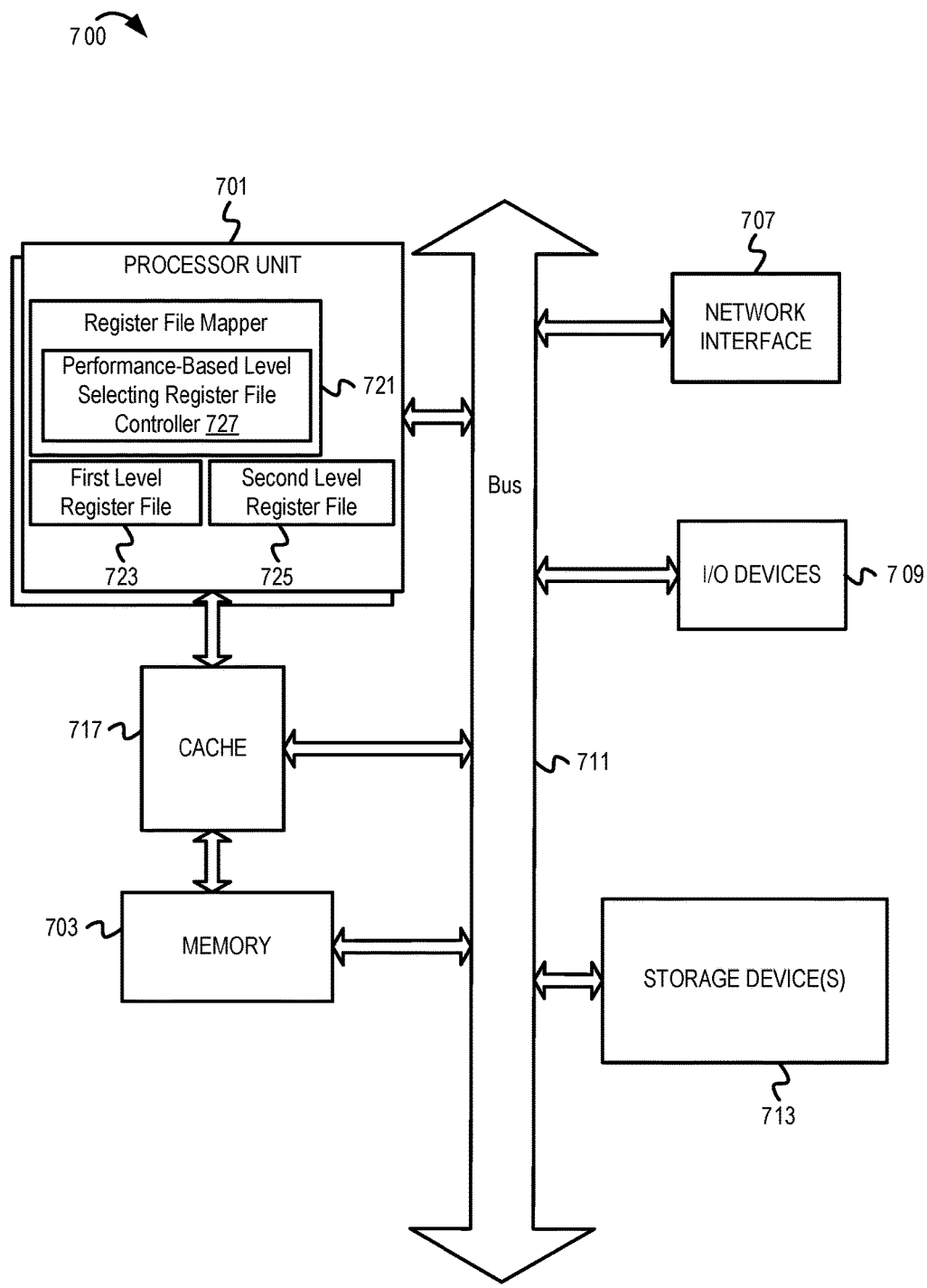
FIG. 7 depicts an example computer system with a performance-based level selecting register file controller.

FIG. 7 depicts an example computer system with a performance-based level selecting register file controller. A computer system includes a processor unit 701 (possibly including multiple processors, multiple cores, multiple nodes, and/or implementing multi-threading, etc.). The computer system includes memory 703. The memory 703 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 711 (e.g., PCI, ISA, PCI-Express, HyperTransport® bus, InfiniBand® bus, NuBus bus, etc.), I/O devices 709 (e.g., keyboard, mouse, monitor, microphone, speaker, etc.), a network interface 707 (e.g., an ATM interface, an Ethernet interface, a Frame Relay interface, SONET interface, wireless interface, etc.), a cache 717 (e.g., a direct mapped cache, a 2-way set associative cache, a fully associative cache, etc.), a register file mapper 721, a first level register file 723, a second level register file 725 and a storage device(s) 713 (e.g., optical storage, magnetic storage, etc.). The cache 717 may be a lower level cache (e.g., L1 cache embodied in a processor) or a higher level cache (e.g., L2 cache, L3 cache, etc.). The register file mapper 721, first level register file 723, and second level register file 725 embody functionality to implement embodiments described above. The register file mapper 721 functions as described above, utilizing a performance-based level selecting register file controller 727 to efficiently make use of the first level register file 723 and the second level register file 725. The register file mapper 721 can also utilize a register file bypass system and hasher to further improve the efficiency of the first level register file 723 and the second level register file 725. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, storage device(s) 713, network interface 707, cache 717, and I/O devices 709 are coupled to the bus 711. Although illustrated as being coupled to the bus 711, the memory 703 may be coupled to the processor unit 701.

While the embodiments are described with reference to various implementations and exploitations, it will be understood that these embodiments are illustrative and that the scope of the inventive subject matter is not limited to them. In general, techniques for efficiently utilizing a multi-level register file as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of operating a processor for efficient use of a multi-level register file, the method comprising:

receiving an indication of a completed instruction, wherein the indication indicates a logical register, wherein the logical register is mapped to a first physical register in a first level register file via a first entry in a first mapping structure;

determining that metadata associated with the completed instruction indicates that maintaining a mapping of the logical register to the first physical register in the first level register file and allowing data of the logical register to remain in the first physical register in the first level register file will reduce performance of the processor;

responsive to said determining that the metadata associated with the completed instruction indicates that maintaining the mapping of the logical register to the first physical register in the first level register file and allowing the data of the logical register to remain in the first physical register in the first level register file will reduce performance of the processor, determining whether a second mapping structure includes a second entry that maps the logical register to the first physical register in the first level register file for the completed instruction;

if the second mapping structure includes the second entry that maps the logical register to the first physical register in the first level register file for the completed instruction, indicating in the second entry that the second entry is to be victimized first;

if the second mapping structure does not include the second entry that maps the logical register to the first physical register in the first level register file for the completed instruction, writing the data of the logical register to a second physical register in a second level register file and avoiding updating the second mapping structure to include the second entry that maps the logical register to the first physical register in the first level register file to allow the first physical register in the first level register file to be available; and removing the first entry in the first mapping structure.

2. The method of claim 1,
wherein said determining that the metadata associated with the completed instruction indicates that maintaining the mapping of the logical register to the first physical register in the first level register file and allowing data of the logical register to remain in the first physical register in the first level register file will reduce performance of the processor comprises determining that the metadata associated with the completed instruction indicates that the completed instruction is associated with one of a low priority thread, a microcoded routine, a routine that does not commonly access logical registers, and an excessively thrashing thread.

3. The method of claim 1,
wherein said determining that the metadata associated with the completed instruction indicates that maintaining the mapping of the logical register to the first physical register in the first level register file and allowing data of the logical register to remain in the first physical register in the first level register file will reduce performance of the processor comprises determining that the metadata associated with the completed instruction indicates that the completed instruction is referencing an infrequently accessed logical register.

4. The method of claim 1, further comprising:
incrementing a value of the metadata in a register designated to host the metadata responsive to one of an instruction accessing the logical register and data associated with a thread being written to the second level register file.

5. The method of claim 1, further comprising:
resetting a value of the metadata to a base value in a register designated to host the metadata responsive to the passage of a set period defined by one of time and clock cycles.

6. The method of claim 1, further comprising:
modifying a first value of the metadata in a register designated to host the metadata responsive to a program instruction directing the processor to set the metadata to indicate a second value.

7. A computer program product for operating a processor for efficient use of a multi-level register file, the computer program product comprising:
a non-transitory computer readable storage medium having computer usable program code embodied therewith, the computer usable program code configured to:
receive an indication of a completed instruction, wherein the indication indicates a logical register, wherein the logical register is mapped to a first physical register in a first level register file via a first entry in a first mapping structure;

determine that metadata associated with the completed instruction indicates that maintaining a mapping of the logical register to the first physical register in the first level register file and allowing data of the logical register to remain in the first physical register in the first level register file will reduce performance of the processor;

responsive to a determination that the metadata associated with the completed instruction indicates that maintaining the mapping of the logical register to the first physical register in the first level register file and allowing the data of the logical register to remain in the first physical register in the first level register file will reduce performance of the processor, determine whether a second mapping structure includes a second entry that maps the logical register to the first physical register in the first level register file for the completed instruction;

if the second mapping structure includes the second entry that maps the logical register to the first physical register in the first level register file for the completed instruction, indicate in the second entry that the second entry is to be victimized first;

if the second mapping structure does not include the second entry that maps the logical register to the first physical register in the first level register file for the completed instruction, write the data associated with the logical register to a second physical register in a second level register file and avoid updating the second mapping structure to include the second entry that maps the logical register to the first physical register in the first level register file to allow the first physical register in the first level register file to be available; and remove the first entry in the first mapping structure.

8. The computer program product of claim 7,
wherein the computer usable program code configured to determine that the metadata associated with the completed instruction indicates that maintaining the mapping of the logical register to the first physical register in the first level register file and allowing data of the logical register to remain in the first physical register in the first level register file will reduce performance of the processor comprises the computer usable program code configured to determine that the metadata associated with the completed instruction indicates that the completed instruction is associated with one of a low priority thread, a microcoded routine, a routine that does not commonly access logical registers, and an excessively thrashing thread.

9. The computer program product of claim 7,
wherein the computer usable program code configured to determine that the metadata associated with the completed instruction indicates that maintaining the mapping of the logical register to the first physical register in the first level register file and allowing data of the logical register to remain in the first physical register in the first level register file will reduce performance of the processor comprises the computer usable program code configured to determine that the metadata associated with the completed instruction indicates that the completed instruction is referencing an infrequently accessed logical register.

10. The computer program product of claim 7, wherein the computer usable program code is further configured to increment a value of the metadata in a register designated to host the metadata responsive to one of an instruction accessing the logical register and data associated with a thread being written to the second level register file.

11. The computer program product of claim 7, wherein the computer usable program code is further configured to reset a value of the metadata to a base value in a register designated to host the metadata responsive to the passage of a set period defined by one of time and clock cycles.

12. The computer program product of claim 7, wherein the computer usable program code is further configured to modify a counter register designated to host the metadata responsive to a program instruction directing the processor to set the counter register to indicate a value.

13. A processor comprising:
a first level register file of physical registers;
a second level register file of physical registers, wherein the first level register file is more efficiently accessed relative to the second level register file;
a register file mapper coupled with the first level register file and the second level register file, the register file mapper comprising at least one mapper member of the group consisting of a first circuit, first microcode, first firmware and first resident software of the processor, the register file mapper including a first mapping structure operable to host a first set of one or more mappings of logical registers to physical registers of the first level register file and a second mapping structure operable to host a second set of one or more mappings of the logical registers to the physical registers of the first level register file; and
a register file mapper controller comprising at least one controller member of the group consisting of a second circuit, second microcode, second firmware and second resident software of the processor, the at least one controller member operable to:
receive an indication of a completed instruction, wherein the indication indicates a specified logical register of the logical registers, wherein the specified logical register is mapped to a first physical register of the physical registers in the first level register file via a first entry in the first mapping structure;
determine that metadata associated with the completed instruction indicates that maintaining a mapping of the specified logical register to the first physical register in the first level register file and allowing data of the specified logical register to remain in the first physical register in the first level register file will reduce performance of the processor;
responsive to the determination that the metadata associated with the completed instruction indicates that maintaining the mapping of the specified logical register to the first physical register in the first level register file and allowing the data of the specified logical register to remain in the first physical register in the first level register file will reduce performance of the processor, determine whether the second mapping structure includes a second entry that maps the specified logical register to the first physical register in the first level register file for the completed instruction;
if the second mapping structure includes the second entry that maps the specified logical register to the first physical register of the first level register file for the completed instruction, indicate in the second entry that the second entry is to be victimized first; and
if the second mapping structure does not include the second entry that maps the specified logical register to the first physical register in the first level register file for the completed instruction, write the data associated with the specified logical register to a second physical register of the second level register file and avoid updating the second mapping structure to include the second entry that maps the specified logical register to the first physical register of the first level register file to allow the first physical register in the first level register file to be available; and
remove the first entry in the first mapping structure.

14. The processor of claim 13, wherein the at least one mapper member is further operable to update hardware counters responsive to at least one of referencing a logical register and casting out data from the first level register file to a lower level register file.

15. The processor of claim 14, further comprising a register designated to host a value specifying a threshold that represents a low frequency accessing of a logical register.

16. The processor of claim 14, further comprising a register designated to host a value specifying a threshold that represents a high rate of thrashing for a thread.

17. The processor of claim 13, wherein the at least one mapper member is operable to determine whether the metadata associated with the completed instruction indicates at least one of whether the completed instruction is associated with a low priority thread, the completed instruction is associated with a microcoded routine, and the completed instruction is associated with a routine that does not commonly access destination logical registers.

18. The processor of claim 13, further comprising hardware counters accessible by the register file mapper controller, wherein the hardware counters are operable to host the metadata.

* * * * *